United States Patent [19]

Howe

[11] 4,359,750
[45] Nov. 16, 1982

[54] OPTICAL DISC STRUCTURE

[75] Inventor: Dennis G. Howe, Pittsford, N.Y.

[73] Assignee: Eastman Kodak Company, Rochester, N.Y.

[21] Appl. No.: 259,127

[22] Filed: Apr. 30, 1981

[51] Int. Cl.³ .............................................. G01D 15/34
[52] U.S. Cl. .............................. 346/135.1; 346/76 L; 369/111; 369/275; 358/342
[58] Field of Search ................. 346/135.1, 137, 76 L; 369/44, 45, 46, 275; 358/128.5, 128.6

[56] References Cited

U.S. PATENT DOCUMENTS

| | | | |
|---|---|---|---|
| 3,943,302 | 3/1976 | Johnston, Jr. | 179/100.4 C |
| 4,006,292 | 2/1977 | Schaefer | 358/128 |
| 4,161,752 | 7/1979 | Basilico | 358/128 |
| 4,176,377 | 11/1979 | Howe | 346/76 L X |
| 4,230,915 | 10/1980 | Dil | 369/275 |
| 4,298,975 | 11/1981 | Veen | 346/76 L X |

OTHER PUBLICATIONS

"Optical Spectra", pp. 26, 28 and 29, Dec. 1978.

*Primary Examiner*—Joseph W. Hartary
*Attorney, Agent, or Firm*—John D. Husser

[57] ABSTRACT

An optical disc of the type having a thermally deformable recording layer overlying a reflectively surfaced support features a crenelated disc support surface having grooves of predetermined depth and interleaved lands arranged in a spiral or concentric pattern. The recording layer's outer surface is nominally planar so that the differences in thickness between "over-land" and "over-groove" portions thereof impart high phase-shift contrast to light of a given read wavelength.

11 Claims, 12 Drawing Figures

OPTICAL DISC STRUCTURE

CROSS-REFERENCE TO RELATED APPLICATIONS

Reference is made herein to U.S. Patent Application Ser. No. 184,554, entitled "Medium for Recording by Thermal Deformation", filed Sept. 5, 1980, in the names of Thomas and Wrobel; U.S. Patent Application Ser. No. 124,381, entitled "Physically Optimized Optical Disc Structure, Method and Apparatus", filed on Feb. 25, 1980 in the names of Howe and Wrobel and U.S. Patent Application Ser. No. 217,646, entitled "Optical Disc Structure, Method and Apparatus Physically Optimized for Writing and Reading with a Single Wavelength", filed Dec. 18, 1980, in the names of Howe, Marchant and Wrobel.

BACKGROUND OF THE INVENTION

1. Field of the Invention

The present invention relates to the real-time recording and playback of information in the form of minute, optically-readable deformations which are spaced along spiral or concentric tracks on a disc-shaped storage medium and to an improved disc construction which facilitates such recording and playback.

2. Description of the Prior Art

Optical discs of the kind described above offer the advantage of increased information capacity over previously used information-storage media such as magnetic tape and microfilm. In general, the optical disc approach involves forming micron-sized information bits (e.g., light-modulating discontinuities) along recorded tracks on a surface of the disc. One common way to form such discontinuities in real-time (i.e., so they are readable without an intermediate processing procedure) is to scan the disc with a focused laser beam which is turned on and off according to an encoded signal that contains the information to be recorded. The laser thus forms tracks of discrete deformations in the disc surface. On playback, the tracks are illuminated by a tightly focused reading light beam and variations in the light from deformed and non-deformed track portions are sensed by a photodetector to reproduce the encoded signal.

Although the disc configuration described above is currently the most popular format for such optical storage media, at this stage it should be noted that there are useful formats other than the disc. For convenience, this discussion will refer to the storage media as optical discs, with the understanding that there are other formats having equivalent utility in accordance with the present invention.

To maximize information capacity of optical discs, it is desirable to form the information tracks as closely together as possible without creating a likelihood for interference between adjacent tracks. Interference between tracks can be thought of as a deformation from one track extending sufficiently toward an adjacent track to be detected during the read-out scanning of the adjacent track. Because of this problem track spacing has been limited as to closeness by the minimum size deformation that can be recorded and by the accuracy with which such deformations can be placed as tracks on the recording medium.

Even though high numerical aperture lenses are used to focus the recording energy accurately onto the minute locus of the intended deformation, fluctuations will occur in the focused energy density. For example, recording laser noise, focus servo errors or variations in recording media transport rate can cause such fluctuations. These fluctuations can lead to undesired variations in cross-track width of a deformation. The recording material's sensitivity to the recording energy can also vary and cause undesired cross-track width variations.

Even more troublesome is the difficulty in effecting the recording spot scan precisely along a predetermined path, for example, concentric circles or convoluting spiral tracks. That is, the degree of sophistication and cost of playback tracking is severely aggravated if the recorded tracks are not highly precise in configuration. Complex and expensive control systems are necessary in order to record tracks precisely in their intended positions.

It will be appreciated that for reasons similar to those described above, the minimum track spacing which can be utilized also depends on the size of the reading scan spot, its size variation and the degree of accuracy with which it can be maintained centered on the given track during read-out.

Thus, to obtain close track spacing and the resultant high data storage density, it is necessary to control many parameters precisely. The cost for such control equipment is high; therefore, techniques for relaxing the parameter tolerances and simplifying such control are continuing development objectives.

British Pat. Nos. 1,465,742 and 2,016,747 disclosed one technique for simplifying recording control. In general these patents suggest the provision of some pre-formed disc track which can be followed during recording. These discs are intended as masters for forming replicates. In discs intended for real-time recording and playback, the pre-formed guide track disclosed in those patents would cause noise during playback of the recorded information signal.

In my U.S. Pat. No. 4,176,377, there is disclosed a technique which uses a disc that is sensitive to radiation only along pre-formed recording tracks, and intervening non-sensitive guard bands are located between the recording tracks. Such disc surfaces are pre-formed, e.g., by thermally scribing away the intertrack zones of a recording layer or by photolithographic formation of the recording layer so as to exist only on the predetermined track paths.

SUMMARY OF THE INVENTION

The present invention pertains to an improved optical disc structure, apparatus and method which relax tolerances in real-time recording and playback systems and facilitate the use of simplified control devices. The present invention follows an approach which is similar to the one disclosed in my above-mentioned patent but is particularly adapted for phase-shift tracking and read-out and offers significant advantages in fabrication.

Thus, an object of the present invention is to provide an improved optical disc for the real-time recording and playback of high density information, such disc (1) having pre-formed, detectable, tracking patterns for use during recording and (2) being configured so that recorded information can be read out using phase-shift mark detection techniques.

It is another aspect of the present invention that such improved optical disc provides guard-band structure between information tracks to further relax system tolerances and simplify system controls.

Related objects of the present invention are to provide improved recording and playback apparatus and methods that utilize such improved disc structure.

In general, the present invention features a predetermined, crenelated, disc-substructure (i.e., underlying the disc recording layer) which includes grooves of predetermined width and depth and intermittent lands. The upper recording layer surface is substantially planar and the layer of recording material over the crenelated surface thus varies in thickness predeterminedly in a manner related to the groove and land pattern of the disc-substructure. That is, the recording layer thickness over the grooves is predeterminedly greater than over the lands, and the present invention utilizes this construction to provide guide tracks for recording and to provide guard bands between record tracks. More particularly, by proper design of groove depth and recording layer thickness (in relation to the selected read-light wavelength): (1) the phase difference in reflected light from lands and grooves can be used for tracking while recording and (2) the phase relation of reflected light is such that pit portions recorded off-center, do not present a signal to the phase-shift detection system. Thus during scan of an adjacent track such portions do not "interfere".

BRIEF DESCRIPTION OF THE DRAWINGS

The subsequent more detailed description of the invention refers to the attached drawings which form a part hereof and in which:

FIGS. 11-A and 11-B are exemplary cross-sectional views of a record element, such as shown in FIG. 1, and illustrating relative phase-shift points denoted on the FIG. 10 curves.

DETAILED DESCRIPTION OF THE PREFERRED EMBODIMENTS

Referring to FIGS. 1–4, there is illustrated a portion of an optical disc 1 incorporating one configuration in accord with the present invention. In this embodiment the disc comprises a substrate 2 formed of a suitable plastic material, a reflective coating 3 on the top surface of the substrate and a recording layer 4 overlying the reflective layer. As shown, the surface of substrate 2 is crenelated, forming a series of alternating grooves and lands. The groove and land configuration can be such as to form a series of concentric grooves interleaved by lands or so as to form spiral groove portions interleaved by spiral lands. Subsurface disc structure with either of such configurations is referred to herein as "crenelated". The portions of recording material 4 that overlie a groove on the crenelated surface of layer 2 form recording tracks $T_1$ and $T_2$. Intermediate those tracks the recording material 2 overlies lands in the crenelated surface of layer 2. These between track zones $B_1$ and $B_2$ function for tracking and as guard bands in a manner described in more detail below.

Figures 1, 2, 5:
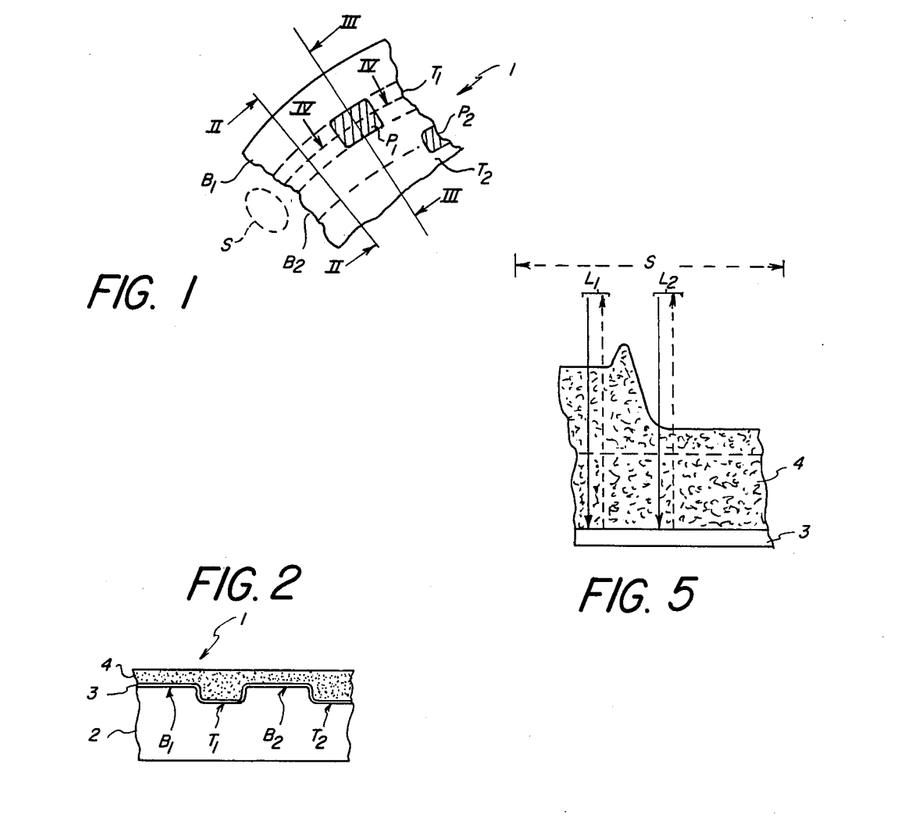
FIG. 1 is a plan view of a portion of a disc constructed according to one embodiment of the present invention.
FIG. 2 is an enlarged sectional view taken along the line II—II of FIG. 1.
FIG. 5 is a further enlarged diagrammatic view of a portion of FIG. 4.

During recording and playback of track $T_1$, the desired conditions are that all pits be recorded in center of the track (see, e.g., pit $P_1$) and that the read light spot S remains centered on $T_1$. However, due to instabilities during recording, some pits are recorded off center with regard to their information track; see e.g., pit $P_2$ with regard to track $T_2$. Also, during read-out the scan of spot S sometimes strays from its centered position on the tracks. Referring to FIG. 1, it will be seen that if spot S strays to the right of track $T_1$ at the time of passing pit $P_2$ in adjacent track $T_2$, pit $P_2$ might interact with the read spot light. To prevent such unintended interactions, prior art tracks have been spaced a distance which allows for the maximum possible deviation of the record spots plus the maximum possible deviation of the read spots. This decreases the storage density of the disc significantly. The approach of my prior Patent U.S. Pat. No. 4,176,377 avoided this loss of storage density by providing inter-track zones such as $B_1$ and $B_2$ that were insensitive to recording. The present invention accomplishes this function in a different manner by provision of a crenelated substructure for the disc, which can also be used for tracking while recording.

Figure 4:
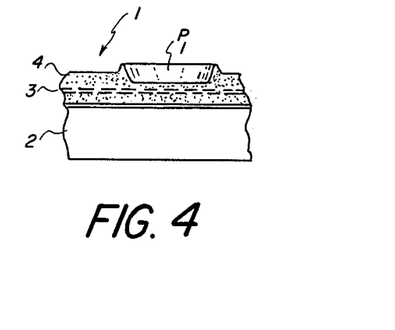
FIG. 4 is an enlarged sectional view taken along lines IV—IV of FIG. 1.

As a preface for explanation of the present invention, refer first to FIG. 5, which is an enlargement of a portion of FIG. 4, and will facilitate understanding of the preferred mode of read-out used in accordance with the present invention. During the period in which a pit, e.g. $P_1$, passes the read spot S (e.g. a laser beam focused on the track), the light returned to the read-out detector consists of light $L_1$ which is influenced in phase by the thickness of recording layer through which it passes, and light $L_2$, which is influenced in phase by the reduced thickness of the pitted portion of the recording layer through which it passes. Note, both light $L_1$ and $L_2$ traverse the recording layer on track $T_1$ (i.e., the portion of the recording layer overlying the groove, not the land). The nominal recording layer thickness and the depth of pit formation are selected so that the phases of reflected light $L_1$ and $L_2$ (vertical dotted lines), returning to a far field detector, not shown, differ by a predetermined amount $\Delta$, e.g. approximately 90°. The read-out detector is configured so that a high depth of modulation output signal is produced when light components $L_1$ and $L_2$ that differ in phase by $\Delta$ are sensed and so that very low depth of modulation output signals occur if phase difference is much less than $\Delta$. Thus, when the focused playback spot S, scanning along the center of track $T_1$ encounters a properly recorded pit such as $P_1$, a high depth of modulation signal is developed from such read-out photodetector.

Consider now a condition when the scan spot S has progressed further along track $T_1$ shown in FIG. 1 and assume a deviation of the scan spot to the right side of track $T_1$ as it passes adjacent pit $P_2$ in track $T_2$. In such an instance the scan spot S would pass over a portion of pit $P_2$, and absent the crenelated substructure of the present invention, a phase interference signal like that described with respect to pit $P_1$ would occur. This would cause a false information output regarding track $T_1$, for pit $P_2$ is in track $T_2$.

However, in accordance with the present invention, the difference in altitude between the land and groove surfaces of the disc substructure (i.e., the groove depth) is selected such that light directed into and reflected back from the off-track portion of pit $P_2$ (i.e., the portion overlying the land surface $B_2$) that has approximately the same phase as the light passing back from the unpitted recording layer portion that overlies a land in the disc substructure. Thus no substantial interference condition exists between light passing back to the detector from pitted and non-pitted portions that overlie lands of the disc substructure, and no appreciable false signal is output even though the scan beam S passes over the off-track portion of pit $P_2$.

In accordance with an additional aspect of the present invention, the depth of grooves in the disc substructure can be selected so that the difference in phase between light passing to the detector from nonpitted portions respectively over lands and grooves yields good phase contrast (e.g. phase differs by approximately $\Delta$). This facilitates simple and accurate recording because the lands or grooves of the crenelated surface can be tracked by reading wavelength light during the recording operation. Both the guard band and track-while-record aspects of the of the present invention will now be explained in more detail with reference to FIGS. 6–8.

Figure 6:
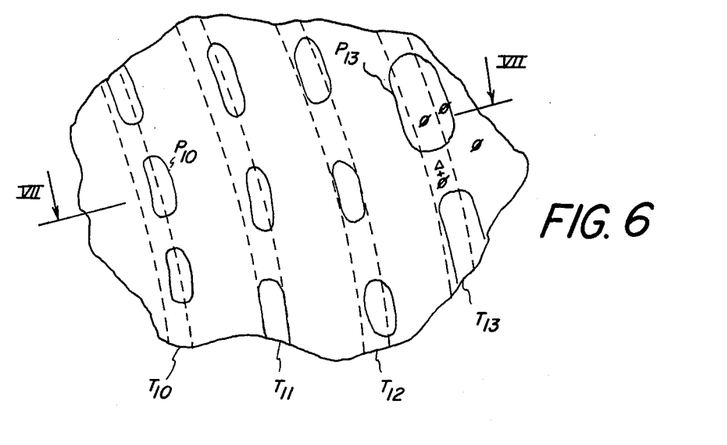
FIG. 6 is a plan view of another portion of a disc such as shown in FIG. 1–5.
Figure 7:
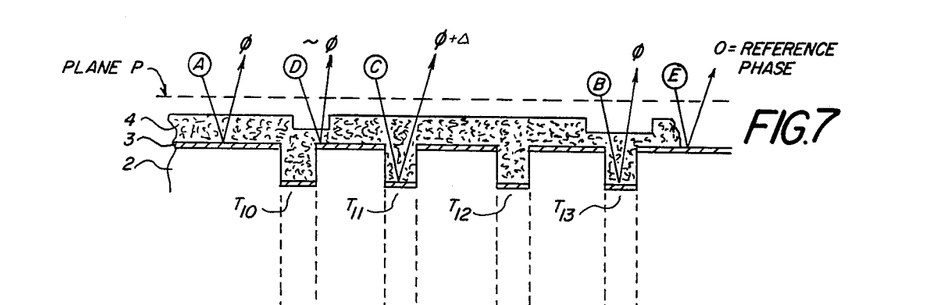
FIG. 7 is a diagrammatic sectional view taken along the lines VII—VII of FIG. 6.
Figure 8:
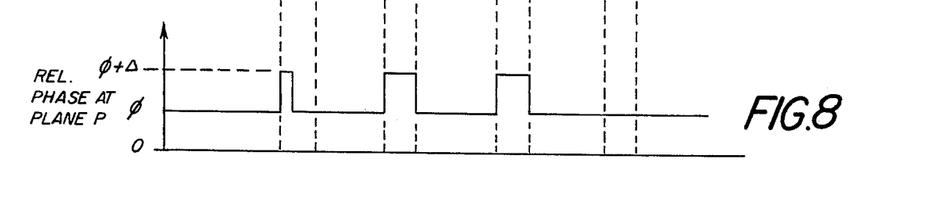
FIG. 8 is a diagram illustrating relative phase-shifts imparted to read-light by various portions shown in FIG. 7.

FIG. 6 illustrates a top plan view of a portion of a disc structure according to the present invention having portions of four radially-spaced guide tracks $T_{10}$, $T_{11}$, $T_{12}$ and $T_{13}$ which are defined by the underlying grooves of the disc's crenelated substructure. FIG. 7 is a cross-sectional view of the FIG. 6 disc portion taken along the line VII—VII of FIG. 6, and FIG. 8 is a graphic illustration of relative phase (at plane P during its egress) of reading wavelength light reflected from the disc.

Considering first the aspect of the present invention whereby the disc's crenelated substructure provides a reference for tracking while recording, the pit deformations shown in FIGS. 6 and 7 can be ignored, as they would not be present at the inception of a recording sequence. As illustrated by light rays A and C of FIG. 7, the disc substructure and recording layer thickness are designed so that the respective rays traverse maximally different thicknesses of recording layer. Thus the relative phase of exiting light A differs from exiting light C by a predetermined amount $\Delta$. The value of $\Delta$ will depend on the configuration of phase detection system utilized, but $\Delta$ values of be either about 180° or about 90° can provide that the interference between light ray A and light ray C will produce high depth of modulation signals from a properly configured far field detector. Considering the foregoing, it will be appreciated that as a beam of the reading light wavelength is scanned along the disc track (e.g., $T_{10}$) slightly ahead of or behind the recording light beam, a maximum contrast tracking signal is provided for controlling the position of the recording light beam. That is, when read light beam moves from a position centered over one of the tracks (defined by the underlying groove surface), the signal detected by a properly configured far field detec-
tor will vary markedly because of the substantial interference between light A and light C. The optics for radial tracking of recording-light beam can be coupled for tracking movement with the optics which radially track the reading beam, and in this manner radial position correction of the reading beam position, based on such detected signal, will maintain the recording beam in substantial alignment over the tracks $T_{10}$–$T_{13}$.

As shown in FIGS. 6 and 7, when the recording sequence is completed, there will exist a series of pits which have deformed the recording layer generally aligned above the grooves which define tracks $T_{10}$–$T_{13}$. A preferred mode of implementing such pit formation is by forming the recording layer of a dye-binder composition having a high absorption factor (e.g., greater than 20) with respect to the recording light wavelength. Various useful dye-binder layers are disclosed, in conjunction with their respective recording light wavelength, in copending U.S. Application Ser. No. 184,554, filed Sept. 5, 1980, in the names of Thomas and Wrobel. As disclosed in that application, these recording layers are substantially transparent to light of the selected reading wavelength.

Even with radial tracking control as described, it is possible that certain of the pits will be formed with portions extending beyond the limits of the underlying crenels in the disc substructure. For example, as shown in FIGS. 6 and 7, pit $P_{10}$ illustrates a circumstance where the tracking servo mechanism had not yet completely effected re-alignment of the recording beam with track $T_{10}$, and pit $P_{13}$ illustrates the circumstance where a temporal fluctuation in the recording beam power caused formation of an enlarged pit structure. As indicated above, such imperfection in recording could, in prior art structures, cause spurious signals during read-out of adjacent tracks $T_{11}$ and $T_{12}$. However, further reference to FIG. 7 will illustrate how the present invention obviates this possibility.

As noted above, the reading light ray A reflected from an "unpitted-over-land" portion of the recording layer encounters a relative phase-shift of $\phi$. (Note, relative phase-shift here means relative to the phase that light reflected from a land disc portion that has zero recording layer thickness on it, e.g. ray E in FIG. 7.) Similarly it was explained that the reading light ray C reflected from an "unpitted-over-groove" portion encounters a relative phase-shift of $\phi+\Delta$ because of the longer path of travel in the recording layer. Now note the relative phase-shift imparted to light rays B and D which respectively are reflected from a "pitted-over-groove" portion and a "pitted-over-land" portion of the disc recording layer. As indicated in FIGS. 7 and 8, in accordance with the present invention the light ray B will have a relative phase-shift of $\phi$ and ray D will have relative phase of approximately $\phi$. It will not be immediately apparent how this is effected because the rays appear to traverse different thickness of recording layer; however this will be explained subsequently. For the present, consider the advantage in read-out which is obtained by the circumstances just outlined.

As the read beam scans along track $T_{11}$ only the "unpitted-over-groove" portions of the disc will impart a significantly different relative phase-shift to it. That is, the light such as ray C, traversing the "unpitted-over-groove" portions will have a relative phase-shift $\phi+\Delta$ while the light traversing all remaining disc portions, illustrated by rays A, B and D will have a relative phase-shift $\phi$ or approximately $\phi$. With this condition, if the read light beam scanning track $T_{11}$ encounters the portion of pit $P_{10}$ to the right of track $T_{10}$, no spurious signal will be generated because the recording layer portion underlying the "over-land" portion of pit $P_{10}$ imparts approximately the same phase-shift to the read beam as its adjacent "unpitted-over-land" portions (compare rays A and D). Thus both pitted and unpitted portions existing over the lands impart approximately the same phase-shift; and there will be no appreciable signal in a phase-shift detection system due to transitions between pitted and unpitted portions overlying the land substructure of the disc, i.e., the guard band portions between tracks of the disc.

Thus the information signal is provided to the phase detection system only by transitions between pitted and non-pitted portions which overlie the groove substructure of the disc, i.e., the track portions. From a simplified viewpoint the recording of pits can be viewed as rendering "pitted" over-groove portions of the disc "invisible" to the phase-shift detector, i.e., of the same relative phase characteristic as all remaining portions of the disc (except the non-pitted over-groove portions). In read-out, the reading light beam is controlled to follow the tracks of "visible" portions of the recording layer, i.e., concentric or spiral convolutions of non-pitted over-groove recording layer portions. The information signal is imparted to the phase-shift detector by the transitions between pitted and non-pitted over-groove portions of the recording layer. Also, if desired, information (e.g., data file addresses and headers) can be added by modulating the groove depth along a track.

Figure 9:
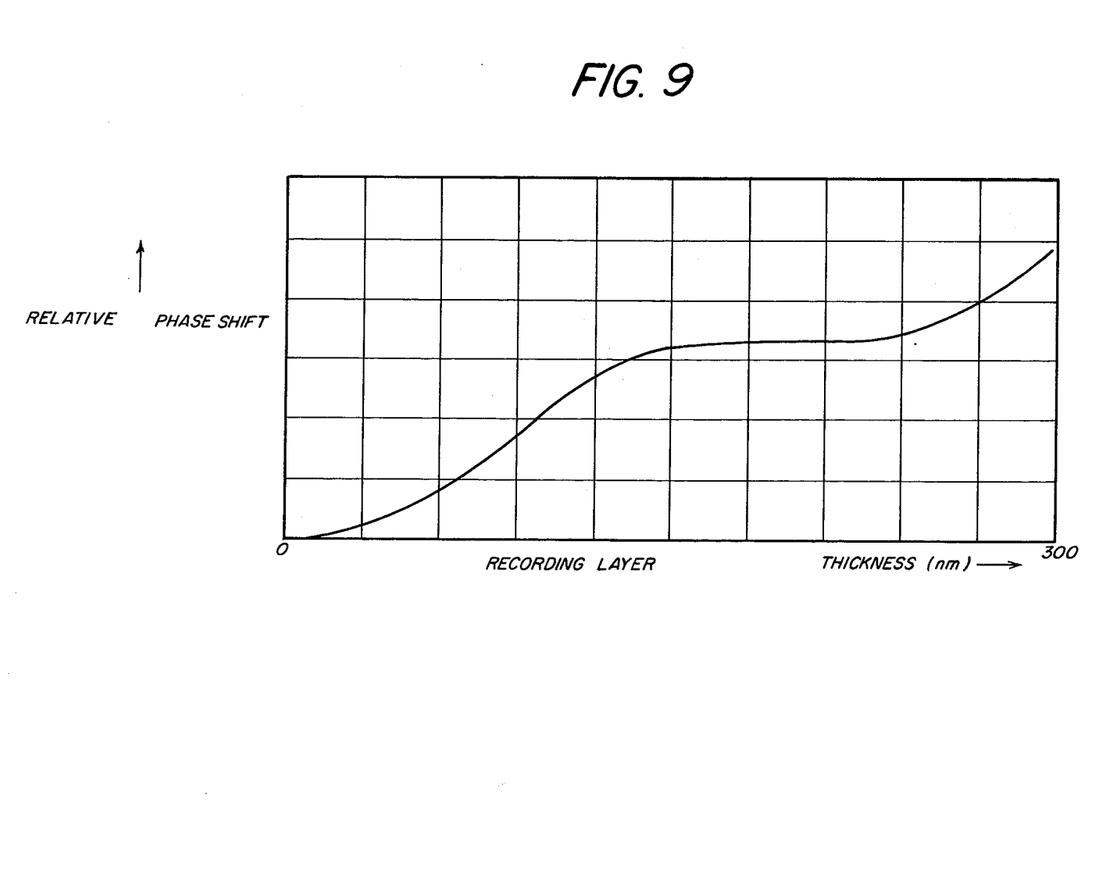
FIG. 9 is a relative phase-shift to thickness variation curve for an exemplary recording element.

With the general mode of operation now in mind, refer to FIG. 9 for explanation of how the disc structure in accordance with the present invention provides the phase-shift conditions illustrated in FIGS. 6–8. As disclosed in U.S. application Ser. No. 124,381, filed on Feb. 25, 1980 in the names of Howe and Wrobel, it has been found that certain bilayer recording systems of the kind described above as particularly useful according to the present invention, exhibit a non-linear relative phase-shift to recording layer thickness characteristic. This occurs because light reflected by these systems is a combination of two significant constituents, namely: (1) light that is reflected directly from the first surface of the recording layer and (2) light reflected from the underlying reflective layer which has traversed through the recording layer. More specifically, the non-linear phase-shift to recording layer thickness relation (see FIG. 9) of such elements exhibits distinct zones characterized respectively by more rapid and more gradual slope. It will be seen that for such layers there are thickness zones wherein a given thickness variation causes a relatively high magnitude phase-shift change and thickness zones wherein an equivalent magnitude thickness variation causes a relatively low magnitude phase-shift change.

Layers exhibiting non-linear characteristics such as shown in FIG. 9 are highly useful in combination with crenelated disc sub-structure to achieve results such as described with respect to FIGS. 6–8. When a bilayer recording system such as disclosed in U.S. Patent Application Ser. No. 124,381 is constructed on a crenelated substrate the phase-shift versus recording layer characteristic (FIG. 9) is modified. This occurs because the crenelated disc substrate is, in effect, two separate substrates; one substrate can be considered to be a plane containing the land portions of the disc while the second is a plane containing the bottoms of the grooved portions of the disc. Referring to FIG. 7, we see that light reflected from the bottoms of the grooved portions of the disc will always travel a distance of at least 2 $D_G$ further than light reflected from land portions ($D_G \equiv$ depth of the grooves), i.e. light reflected from the groove bottoms will always be shifted by at least $4\pi D_G/\lambda$ in phase relative to light reflected from land portions. Thus, if an equal amount of recording material was coated over both the land and groove portions, the relative phase of light reflected from those two portions of the disc would be $4\pi D_G/\lambda$. However, since the top surface of the crenelated disc substrate is flat (planar), the thickness of recording material overlaying a groove in an unrecorded disc is always $D_G$ larger than that overlaying a land.

Figure 10:
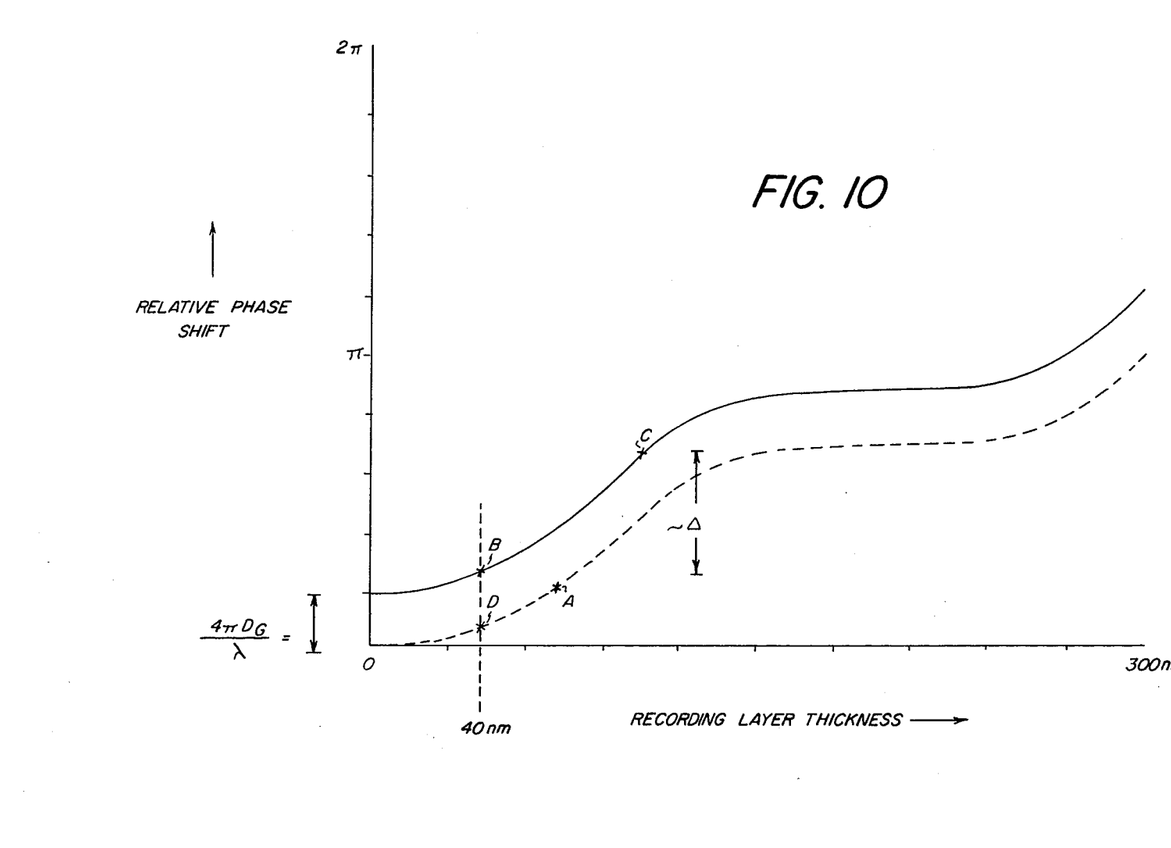
FIG. 10 is relative phase-shift to thickness variation curves for a recording element having a crenelated substrate in accordance with the present invention.

The phase-shift versus thickness characteristic for a crenelated disc is thus made up of two curves such as the one shown in FIG. 9. The two curves are displaced along the phase-shift axis by $4\pi D_G/\lambda$. FIG. 10 is a crenelated disc phase-shift versus recording layer thickness characteristic curve for the case in which $D_G \approx \lambda/20$ where $\lambda$, the read light wavelength, is 633 nm. The relative phase-shift versus recording layer thickness for light reflected from grooves is specified by the upper (solid) curve in FIG. 10 while the same quantity for light reflected from lands is given by the lower (dashed) curve.

Figure 11A:
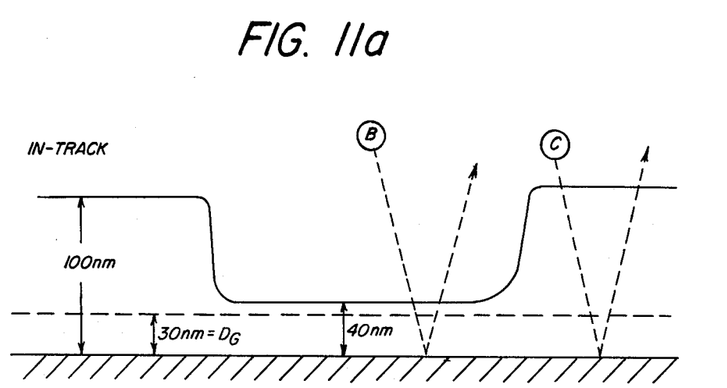
Figure 11B:
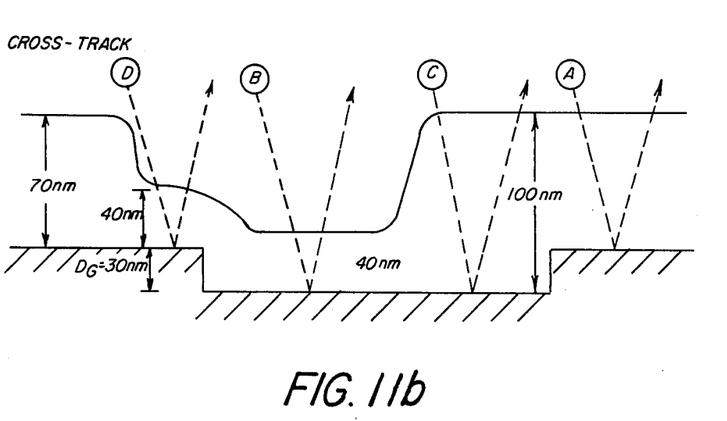

Consider the case where $\lambda = 633$ nm and $D_G = \lambda/20 \approx 31$ nm and the coated recording layer thickness over the land areas of the crenelated disc is 70 nm, so that the recording layer thickness over the grooves is ~100 nm. If pits are recorded that have ~40 nm of residual recording material beneath them (i.e., between the pit bottoms and the reflecting layer on the crenelated substrate), the situation will be as shown in FIGS. 11-A and 11-B. FIG. 11-A shows a section along a groove through an on-track recorded pit such as $P_1$ in FIG. 1. FIG. 11-B shows a section perpendicular to the groove through a somewhat off-track recorded pit such as $P_2$ in FIG. 1. (It is difficult to record pits that have less than ~40 nm of residual recording material beneath them since the thermal diffusion length for times equal to the recording laser pulse length of interest in the bilayer recording systems considered here is about 40 nm. This prevents the recording layer material lying within 40 nm of the reflective layer on the substrate from becoming hot enough to ablate away.)

The relative phases of the light rays of interest, A, B, C, and D shown in FIGS. 11-A and 11-B, are marked as points A, B, C, and D on FIG. 10. As was explained above in connection with FIG. 7, the recorded signal information is carried by the relative phase-shift $\Delta$ to reflected read-out light by the non-recorded "unpitted" regions overlying the groove portions of the substrate. These regions are shown as being traversed by light ray C in FIG. 11-A. For correctly recorded pits, i.e., those lying over the grooves in the substrate, the in-track and cross-track relative phase-shifts that provide signal to the read-out phase-shift detector occurs between rays C and B and C and A respectively (see FIGS. 11-A and 11-B). From FIG. 10 we see that for the case illustrated, the signal producing relative phase-shift $\Delta$ is somewhat greater than $0.4\pi$. Also, note that prior to any recording, the relative phase-shift between rays A and C is available for tracking.

The guard band properties of the disc structure are illustrated by FIG. 11-B. Suppose one were reading information recorded along the groove immediately to the left of the groove shown in FIG. 11-B. The requirement is that the portion of the pit shown in FIG. 11-B that overlays the land region between the two grooves in question be substantially invisible, i.e., impart a small relative phase-shift to the reflected read-out light, in the event that the read-out light spot were to wander over it. The relative phase-shift in question is that between the rays A and D in FIG. 11-B and from FIG. 10 we see that it is quite small.

The aforementioned application Ser. No. 124,381 discloses how disc elements having recording layers of interest can be optimized as to optical constants to shift the thickness locus of the steep and flat portions of the phase-shift to recording layer thickness curves such as that in FIG. 9 and is incorporated herein by reference. For example, the recording layer's refractive index (with respect to reading light) can be varied; or dielectric spacer layers of predetermined refractive index can be provided between the recording layer and the reflective layer. The depth of grooves in the disc substructure, i.e., the distance from the land surface to the groove surface, can be selectively formed by embossing the disc substrate or by similarly impressing the desired crenelated structure in a surfacing layer applied over the disc substrate. Photographic techniques, such as exposure of photoresist or photopolymer or imagewise deformation of a thermoplastic are useful also. Note that the groove fabrication process is simplified since only shallow grooves of low aspect ratio (i.e., depth divided by width) are required. The pit depth can be controlled within a desired range by control of the recording beam power and rate of rotation of the disc during recording and, due to the thermal conduction of the reflective layer, it is quite easy to obtain pits that have a thermal diffusion length of material between their bottoms and the reflective surface. Thus it will be appreciated that various disc configurations can be designed which will provide for generally equivalent relative phase-shift for disc portions other than the "non-pitted over-groove" portion and for a significantly different, relative phase-shift for the "non-pitted over-groove" portion.

Figure 3:
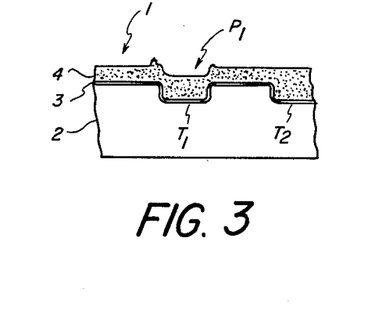
FIG. 3 is an enlarged sectional view taken along lines III—III of FIG. 1.

One further optimizing aspect should be noted. Referring to FIGS. 3-5, it can be seen that pit rims often surround the pit deformations. Thus these will be most prevalent at the transition between pitted and non-pitted over the groove portions. It is useful to select the nominal thickness of the "non-pitted over-groove" portion so that a substantial thickness zone of relatively low phase-shift exist to the right of (i.e., toward greater thickness) on the phase-shift to layer thickness curve for the selected recording layer material. This will cause such rim portions to exhibit substantially the same relative phase-shift as the non-pitted over-groove portions.

U.S. patent application Ser. No. 217,646, entitled "Optical Disc Structure, Method and Apparatus Physically Optimized for Writing and Reading with a Single Wavelength", filed Dec. 18, 1980, in the names of Howe, Marchant and Wrobel, discloses how optical discs can be optimized as to optical constants and recording layer thickness to yield similar phase-shift to thickness variation curves for systems using a single write/read wavelength. In accordance with the present invention, crenelated substructures can also be constructed which cooperate with the phase-shift to thickness variation curves of such single wavelength systems and the teachings of this last mentioned application are incorporated herein by reference.

The invention has been described in detail with particular reference to certain preferred embodiments thereof, but it will be understood that variations and modifications can be effected within the spirit and scope of the invention.

What is claimed is:

1. In an optical disc of the type having a recording stratum including a thermally deformable recording layer overlying a reflectively surfaced support, the improvement wherein said support surface is crenelated, having a plurality of substantially continuous and uniform-depth grooves and interleaved lands arranged in a spiral or concentric pattern, and said recording stratum has a nominally planar outer surface whereby the thickness of recording stratum portions respectively overlying grooves and lands of said support surface differ in accordance with said groove depth.

2. The invention defined in claim 1 wherein said recording stratum is substantially transparent to light of a given read-wavelength and the thickness difference between the over-land and the over-groove portions of said recording stratum is such as to provide a high phase difference between light of said read-wavelength reflected from such respective portions.

3. The invention defined in claim 1 wherein said recording layer has optical constants such that the plot of relative phase-shift to recording stratum thickness variation with respect to light of said read-wavelength exhibits first and third thickness zones of relatively gradual slope on either side of a second thickness zone of relatively rapid slope and wherein the thickness of said recording stratum is such that the thicknesses of said over-land portions of said disc are proximate such a first thickness zone and the thickness of said over-groove portions are proximate such a third thickness zone.

4. The invention defined in claim 3 further comprising a plurality of discrete information pits which are formed in said recording layer generally over said groove portions of said disc and which have a predetermined depth such that the thickness of the recording stratum under said pits and aligned with a groove portion therebeneath, is proximate said first thickness zone.

5. The invention defined in claim 4 wherein the nominal thickness of said recording layer and the depth of said pits are such that the thickness of the recording stratum under said pits and aligned with land portions of said disc also is proximate said first thickness zone.

6. In an optical disc of the type having a recording stratum including a thermally deformable recording layer overlying a reflectively surfaced support, the improvement wherein said support surface is crenelated, having a plurality of continuous, uniform-depth grooves defining radially-spaced spiral or concentric track regions and with interleaved land regions of uniform height, and said recording stratum has a nominally planar outer surface whereby the thickness of recording stratum portions respectively overlying the track regions and the land regions are predeterminedly different.

7. The invention defined in claim 6 further comprising a plurality of discrete information pits of substantially uniform depth which are formed in said recording layer generally within said track regions.

8. The invention defined in claim 7 wherein said recording stratum is substantially transparent to light of a given read-wavelength and the nominal recording stratum thickness over land regions is predeterminedly less than the nominal recording stratum thickness over track regions by a predetermined magnitude providing a high phase difference between light of said read-wavelength reflected from such respective regions.

9. The invention defined in claim 8 wherein said recording layer has optical constants such that the plot of relative phase-shift to recording stratum thickness variation with respect to light of said read-wavelength exhibits first and third thickness zones of relatively gradual slope on either side of a second thickness zone of relatively rapid slope and wherein the thickness of said recording stratum is such that the thicknesses of said over-land regions of said disc are proximate such a first thickness zone and the thickness of said over-track regions are proximate such a third thickness zone.

10. The invention defined in claim 9 wherein said pit depths are such that the thickness of the recording stratum under said pits and aligned with a track region therebeneath, is proximate said first thickness zone.

11. The invention defined in claim 10 wherein the nominal thickness of said recording layer and the depth of said pits are such that the thickness of the recording stratum under said pits and aligned with land regions of said disc also is proximate said first thickness zone.

* * * * *